Patented Nov. 1, 1932

1,885,451

UNITED STATES PATENT OFFICE

GEORG KRAENZLEIN, OF FRANKFORT-ON-THE-MAIN-HOCHST, RICHARD KARL MÜLLER, OF BAD SODEN-ON-THE-TAUNUS, AND LUDWIG WILHELM BERLIN, OF FRANKFORT-ON-THE-MAIN-HOCHST, GERMANY, ASSIGNORS TO I. G. FARBENINDUSTRIE AKTIEN-GESELLSCHAFT, OF FRANKFORT-ON-THE-MAIN, GERMANY

PROCESS OF PREPARING AN ACTIVE MASS FOR CATHODES OF ELECTRIC ALKALINE ACCUMULATORS

No Drawing. Application filed May 22, 1930, Serial No. 454,826, and in Germany June 6, 1929.

The present invention relates to a process of preparing an active mass for cathodes of electric alkaline accumulators.

We have found that an improved active mass for cathodes can be prepared in a simple manner by mixing highly active pulverulent iron in a certain proportion (for instance molecular proportion of Fe : Cd=1 : 1, 2 : 1 or 4 : 1) with cadmium hydroxide. For this purpose pulverulent iron can be used which is obtained by oxidation of pulverulent iron prepared from iron carbonyl and reduction of the ferrosoferric oxide ($Fe_3O_4$) thus produced by means of hydrogen. The ferric oxides may also be reduced after having been mixed with cadmium hydroxide. In the known processes for making the active mass consisting of iron and cadmium for the negative pole electrodes in alkaline accumulators, the iron and cadmium are simultaneously precipitated electrolytically from a mixture of their solutions. After washing, and drying, the alloy thus obtained has to be ground so as to form a fine powder. According to the present invention, the fine state of subdivision of the cadmium and iron is attained by starting, for instance, from finely divided iron flakes prepared from iron carbonyl; by a simple mixing of the constituents in a mixing- and kneading-apparatus a highly active mass for cathodes is obtained.

By the use of these cathodes with the anodes of nickel hydroxide and graphite prepared from a special graphite, the laminæ of which are of a certain size and purity, the capacity of the accumulator is considerably increased as compared with that of the alkaline accumulator hitherto used, this being accomplished without the addition of lithium hydroxide to the electrolyte and without an increase of weight.

The cathodes may also be combined with anodes, the active mass of which consists of cobalt hydroxide or nickel hydroxide and in which furthermore very small nickel laminæ or the like may be used as an electric conductor instead of graphite.

The following examples illustrate the invention, but they are not intended to limit it thereto:

1. 128 grams of crystallized cadmium sulfate (1 mol. of Cd) dissolved in water are precipitated by the addition of 81 cc. of NaOH (40° Bé.); the precipitate is washed until neutral. To the still moist precipitate of cadmium hydroxide 55.8 grams of iron (2 mol. of Fe) obtained by the reduction of pulverulent $Fe_3O_4$ in a current of hydrogen at 450° C., and 4.5 grams of graphite (containing 99.5 per cent of carbon) are added. The whole is thoroughly mixed in a mixing machine for about 15 minutes, filtered by suction and dried in a current of hydrogen at 250° C.–420° C. The powder thus obtained is pressed into pockets constituting the frame of the cathode and the latter is formed as usual.

2. 128.3 grams of crystallized cadmium sulfate are dissolved in 12.8 liters of water; to this solution 83 cc. of NaOH (40° Bé.) are added drop by drop, while stirring. The whole is filtered by suction and washed until the precipitate is free from sulfuric acid. This paste is mixed in a mixing machine for 1¾ hours with 80 grams of $Fe_3O_4$ (prepared by oxidation of pulverulent iron carbonyl). The whole is then reduced in a current of hydrogen for 3 hours at 250° C., for 2 hours at 330° C., for 2 hours at 450° C. and allowed to cool therein. Then nitrogen is passed through and the powder thus obtained is pressed so as to form tablets which are inserted into pockets and worked up to plates which for a complete charge are again electrolytically reduced as usual.

The proportion of iron to cadmium may be varied. An addition of about 7 per cent of glycerine to the active mass before pressing it has been found useful.

We claim:

1. In the process of preparing an active mass for cathodes of electric alkaline accumulators the steps which consist in mixing highly active pulverulent irons with cadmium hydroxide so as to form a paste and then reducing it in a current of hydrogen.

2. In the process of preparing an active mass for cathodes of electric alkaline accumulators the steps which consist in mixing highly active pulverulent irons prepared by reduction of pulverulent ferrosoferric oxide, with cadmium hydroxide, so as to form a paste, and then reducing it in a current of hydrogen.

3. In the process of preparing an active mass for cathodes of electric alkaline accumulators the steps which consist in mixing highly active pulverulent irons obtained by oxidation of pulverulent iron produced from iron carbonyl and reduction of the ferrosoferric oxide thus produced with hydrogen, with cadmium hydroxide so as to form a paste and then reducing it in a current of hydrogen.

In testimony whereof, we affix our signatures.

GEORG KRAENZLEIN.
RICHARD KARL MÜLLER.
LUDWIG WILHELM BERLIN.